July 26, 1927.
F. A. PARSONS
MILLING MACHINE CONSTRUCTION
Filed May 2, 1925
1,636,755
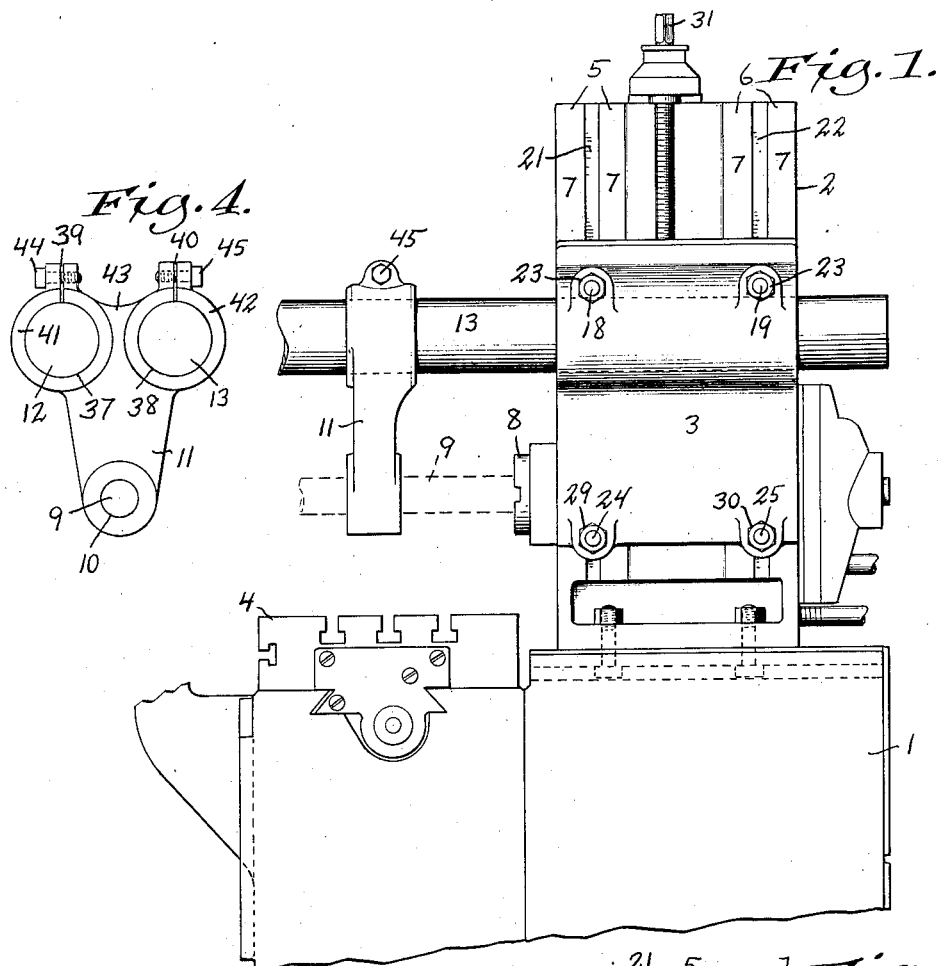
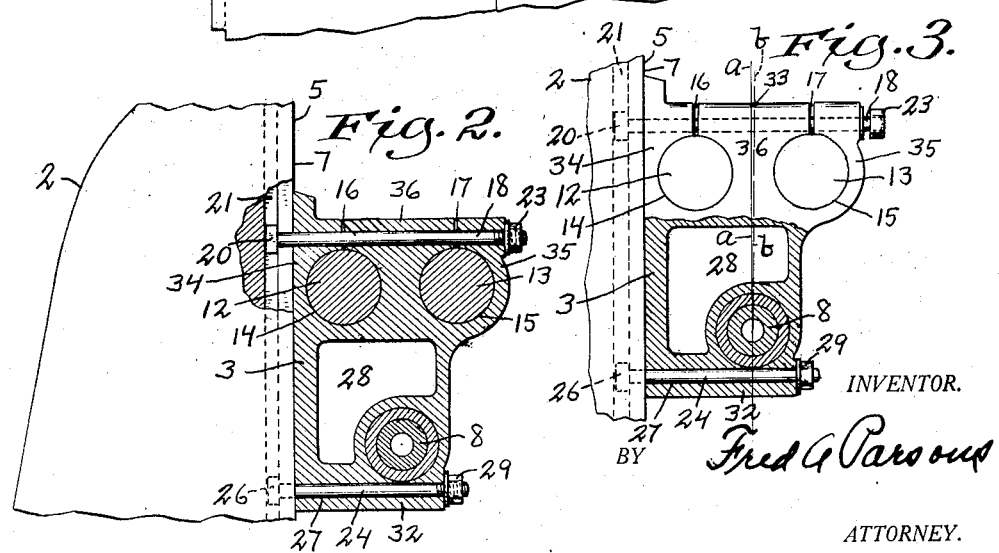
INVENTOR.
Fred A. Parsons
BY
ATTORNEY.

Patented July 26, 1927.

1,636,755

UNITED STATES PATENT OFFICE.

FRED A. PARSONS, OF MILWAUKEE, WISCONSIN, ASSIGNOR TO KEARNEY & TRECKER CORPORATION, OF WEST ALLIS, WISCONSIN.

MILLING-MACHINE CONSTRUCTION.

Application filed May 2, 1925. Serial No. 27,393.

This invention relates to milling machine constructions, and the object of the invention is to improve the construction and operation of milling machines in the manner to be hereinafter described and claimed.

Referring to the drawings, which accompany this specification and form a part hereof, which drawings illustrate an embodiment of this invention, and on which drawings the same reference characters are used to designate the same parts wherever they may appear in each of the several views, Fig. 1 is an elevation of parts of a milling machine; Fig. 2 is an elevation of a part of the milling machine, a part being broken away, and another part being shown in section; Fig. 3 is an elevation of parts of the milling machine, parts being shown in section; and Fig. 4 is an elevation of parts of the milling machine.

Referring to the drawings, the reference numeral 1 designates the base of a milling machine with which is associated the headstock 2, the spindle carrier 3, and the table 4. The headstock 2 is provided with slideways 5 and 6, the surfaces of which lie in one and the same plane and form an accurate reference base for the spindle carrier 3. This reference base is, for convenience, designated by the reference numeral 7 and this reference base is intended to be the base for the determination of the precise positions of the spindle 8 and the tool arbor 9, to insure accuracy of position and cutting operation of a milling cutter, which may be located on the tool arbor 9. The tool arbor 9 is rotated by the spindle 8 in a well-known manner and, for insuring accuracy and rigidity, the tool arbor 9 is supported in a bearing 10 in a pendant 11, which is adjustably mounted on the projecting ends of a plurality of overarms 12 and 13 which are adjustably supported by the spindle carrier 3 in addition to the tool arbor 9. In the construction illustrated by the drawings, the axes of the two overarms 12 and 13 are located, when all the parts are clamped in one of their positions of adjustment, in substantially the same horizontal plane and are placed at substantially equal distances from a vertical plane designated on the drawings by reference letters a—a which passes through the axis of the spindle 8. By this construction, in the present instance, a definite triangular relationship exists between the axes of the tool arbor 9 and the overarms 12 and 13, and it is an object of this invention to reestablish and maintain a definite relationship between the axes of the tool arbor 9 and the overarms 12 and 13, and of the several parts in relation to the reference base whenever such relationship has been disturbed, as for instance, by the unclamping of some of the parts for adjustment.

The spindle carrier 3 is provided with slots 16 and 17 therethrough extending parallel with the axes of the overarms 12 and 13 and in communication with the sockets 14 and 15. Bolts 18 and 19 are provided with heads 20, which engage in T-slots 21 and 22 which are vertically disposed in the headstock 2, and these bolts pass entirely through the spindle carrier 3 and the slots 16 and 17 above the sockets 14 and 15, as clearly shown by Figs. 2 and 3 of the drawings. These bolts are provided with nuts 23. Bolts 24 and 25, which are provided with heads 26 to engage within the T-slots 21 and 22, are passed through bolt holes 27 in the lower part of the spindle carrier 3. It is preferred to provide the spindle carrier 3 with one or more core holes 28 to reduce the weight of the spindle carrier 3, and to have the bolt holes 27 pass through a solid web of metal, as clearly shown by Figs. 2 and 3 of the drawings.

The reference numeral 31 designates a screw for moving the spindle carrier 3 up or down when the nuts 23, 29, and 30 are loosened.

Adjustment of the various parts to suit different manufacturing conditions necessitates movement of the spindle carrier 3 vertically on the headstock 2, also independent adjustment of the overarms 12 and 13 in the spindle carrier; also, that the pendant 11 may be moved longitudinally with respect to the tool arbor 9 either while clamped to the overarms 12 and 13, in which case the overarms move with the pendant and must therefore be unclamped in the carrier, or while unclamped therefrom, in which case the overarms may remain clamped in the carrier.

For the movement of the spindle carrier 3 it is only necessary to loosen nuts 24, 25, and 23, and were it not for the fact that the overarms 12 and 13 must be somewhat smaller in diameter than their respective sockets in order to provide freedom for longitudinal adjustment when unclamped, the unclamping of the spindle carrier would merely result in a trifling increase in the distance of the vertical plane a—a from the reference base or finished face of the headstock 7. The overarms are therefore, as mentioned, a trifle smaller than their respective sockets when their clamp bolts are loosened. When the bolts are tightened, however, the sockets must spring down to rigidly secure the overarms; and since the metal between the overarms is solid and not capable of any springing movement sufficient to clamp the respective arms, it is the metal outside the overarms which must spring. It is for this reason that the slots 16 and 17 are provided.

It will be apparent, however, that if the metal at the outside of the overarms springs away sufficiently to unclamp the arm, the metal between the one arm and the reference base, owing to this springing action, will tend to force the upper portion of the headstock farther away from the reference base than the lower portion where no such action exists, in which case plane a—a, which in the clamped position of the parts is vertical and parallel to the face of the reference base, becomes displaced to a slightly angular relationship with the reference base. Nevertheless, a re-tightening of the bolts will bring the plane a—a again to the position shown and correctly spaced from the reference base while simultaneously clamping the overarms in the spindle carrier and the spindle carrier to the headstock.

It is apparent that in the clamped or operative position, the spacing of the respective overarms from the axis of the spindle should be precisely the same in the spindle carrier 3 as in the pendant 11. Should the clamping of the pendant 11 on the respective overarms be accomplished by a disturbance of portions of the metal in a manner different or in directions different with relation to the plane a—a than the disturbance of the spindle carrier metal when clamping the spindle carrier and the overarms together, the result would be that the pendant 11, when clamped on the overarms, would not precisely align the bore 10 in the pendant for the tool arbor 9 with the spindle axis in the spindle carrier. It is furthermore necessary that the overarms 12 and 13, when clamped, should be precisely parallel as to their respective axes and of precisely the correct center distance, since it is contemplated that the pendant should at times be entirely removed from the overarms, and difficulty might otherwise be had in replacing the pendant on the overarms without loosening the overarms in the spindle carrier, for it would then happen that the ends over which the pendant must be placed would be of different center spacing, accordingly as the overarms projected more or less from the spindle carrier.

I have found that the most improved way of accomplishing all of these various needs, and other useful results, is by the use of a solid central portion or web of metal between the sockets for the overarms both in the spindle carrier, as previously described, and in the pendant; and to provide clamps in each which will tend to force the overarms toward one another and against the solid web, thus accomplishing the previously mentioned necessity that the metal disturbed by the clamping should be disturbed in precisely the same way in the pendant as in the spindle carrier, the result being a structure which will bring the overarms to a precisely parallel axial relationship when clamped in the spindle carrier, and in which the pendant, when clamped on the precisely parallel overarms will precisely align the bore for the tool arbor 9 with the axis of the spindle 8, and will likewise permit of the clamping of the overarms in the spindle carrier by bolts simultaneously used for the clamping of the spindle carrier to the headstock, and making of the overarms, spindle carrier and pendant, when clamped, a unitary structure in which all of the various adjustable parts, when clamped, are returned to a position precisely correct in relationship to the reference base, and to the plane a—a.

Referring now to the pendant 11, as illustrated by Fig. 4 of the drawings, it will be noticed that the sockets 37 and 38 for the overarms are spaced apart by solid and rigid metal exactly the same distance that the sockets 14 and 15 are spaced apart by the part 36 of the spindle carrier 3, and that the slots 39 and 40 are spaced similarly to the slots in the spindle carrier 3 to permit the parts 41 and 42 to spring away from the part 43 when the bolts 44 and 45 are loosened, and to spring back to clamp the arms against the central metal, all in a similar manner and with metal movement in the same direction with reference to the plane a—a, as in the spindle carrier 3.

The bearing 10 and the sockets 37 and 38 in the pendant 11 bear the same triangular relationship to each other as the sockets 14 and 15 and the axis of the spindle 8 in the spindle carrier 3, with the result that the nuts 23, 29, and 30 can be loosened or tightened without affecting the relationship of the overarms and tool arbor 9 with respect to the pendant 11, and that the bolts 44 and 45 may be loosened and tightened, when changing the position of the pendant 11, without affecting the existing relationship between the spindle carrier 3, the overarms, and the spindle 8.

What I claim is:

1. In a milling machine, the combination with a headstock, of a spindle carrier adjustably clampable thereto, a spindle rotatable in said carrier, a tool arbor, overarms, the overarms and the spindle bearing a definite, predetermined, triangular relationship to each other when the spindle carrier is clamped to the headstock, a pendant secured to the overarms and having a bearing for the tool arbor to maintain the tool arbor and the overarms in the same definite, predetermined, triangular relationship that exists between the spindle and the overarms in the spindle carrier, means for clamping the pendant to the overarms, and means for simultaneously clamping the overarms in the spindle carrier and clamping the spindle carrier to the headstock.

2. In a milling machine, the combination with a headstock, of a spindle carrier, overarms, a pendant, the spindle carrier and the pendant being provided with sockets, for the overarms and slots in communication with said sockets, the spindle carrier and the pendant being provided with solid metal of substantially the same thickness between the sockets for the overarms and spring metal parts on the opposite sides of said sockets, means for causing the movement of the spring metal parts of the pendant towards each other for clamping the overarms, and means for simultaneously clamping the overarms to the spindle carrier and clamping the spindle carrier to the headstock.

3. In a milling machine, the combination of a headstock providing a reference surface, a spindle carrier slidable on said surface, a pendant, a plurality of overarms, parallel bores or sockets both in said pendant and in said carrier for the passage of said overarms, said bores being parallel with said surface, slots communicating with said bores both in said carrier and in said pendant, said slots being parallel with said surface, and clamp means embodying a bolt in said carrier and another bolt in said pendant, the axis of each bolt being perpendicular to said slots, whereby movement of metal for the clamping of said overarms shall be in substantially the same direction in the several members and with reference to said surface.

4. In a milling machine, the combination of a headstock providing a reference surface, a spindle carrier slidable on said surface, a pendant, a plurality of overarms, bores for said overarms spaced apart by solid metal of substantially equal thickness, both in said pendant and in said carrier, the axis of each of said bores lying in a plane substantially vertical to said surface, slots communicating with said bores and at right angles to said plane, and clamp means including a bolt both in said carrier and in said pendant, the axis of each of said bolts being substantially parallel with said plane.

5. In a milling machine, the combination with a headstock, of a spindle carrier adjustably clampable thereto, a spindle rotatable in said carrier, a tool arbor, an overarm, the overarm and the spindle bearing a definite predetermined spaced relationship to one another when the spindle carrier is clamped to the headstock, a pendant secured to the overarm and having a bearing for the tool arbor to maintain the tool arbor and the overarm in the same definite predetermined spaced relationship that exists between the spindle and overarm in the spindle carrier, means for clamping the pendant to the overarm, and means for simultaneously clamping the overarm in the spindle carrier and the spindle carrier to the headstock.

In witness whereof I hereto affix my signature.

FRED A. PARSONS.